US005740269A

United States Patent [19]
Oh et al.

[11] Patent Number: 5,740,269
[45] Date of Patent: Apr. 14, 1998

[54] METHOD AND APPARATUS FOR ROBUST BIOLOGICAL SPECIMEN CLASSIFICATION

[75] Inventors: Seho Oh, Mukilteo; Shih-Jong J. Lee, Bellevue; Wendy R. Bannister, Seattle; Chih-Chau L. Kuan, Redmond, all of Wash.

[73] Assignee: NeoPath, Inc., Redmond, Wash.

[21] Appl. No.: 309,209

[22] Filed: Sep. 20, 1994

[51] Int. Cl.$^6$ .................................................. G06K 9/00
[52] U.S. Cl. ........................................ 382/133; 364/413.1
[58] Field of Search .................................. 382/133, 159, 382/134, 224, 227, 128; 364/413.1

[56] References Cited

U.S. PATENT DOCUMENTS

| | | | |
|---|---|---|---|
| 3,699,336 | 10/1972 | Ehrlich et al. | 250/461.2 |
| 3,824,393 | 7/1974 | Brain | 250/222.1 |
| 3,916,176 | 10/1975 | Alien et al. | 364/413.1 |
| 4,045,655 | 8/1977 | Suzuki et al. | 377/10 |
| 4,097,845 | 6/1978 | Bacus | 382/134 |
| 4,129,854 | 12/1978 | Suzuki et al. | 382/134 |
| 4,150,360 | 4/1979 | Kopp et al. | 382/133 |
| 4,175,860 | 11/1979 | Bacus | 356/39 |
| 4,207,554 | 6/1980 | Resnick et al. | 382/133 |
| 4,210,419 | 7/1980 | Castleman | 436/46 |
| 4,213,036 | 7/1980 | Kopp et al. | 382/133 |
| 4,523,278 | 6/1985 | Reinhardt et al. | 364/413.1 |
| 4,596,464 | 6/1986 | Hoffman et al. | 356/336 |
| 4,812,909 | 3/1989 | Yokobayashi et al. | 382/133 |
| 4,965,725 | 10/1990 | Rutenberg | 364/413.1 |
| 5,054,093 | 10/1991 | Cooper et al. | 382/159 |
| 5,068,906 | 11/1991 | Kosaka | 382/133 |
| 5,073,857 | 12/1991 | Peters et al. | 382/133 |
| 5,123,055 | 6/1992 | Kasdan | 382/134 |
| 5,181,259 | 1/1993 | Rorvig | 382/134 |
| 5,235,522 | 8/1993 | Bacus | 364/497 |
| 5,257,182 | 10/1993 | Luck et al. | 364/413.1 |
| 5,268,966 | 12/1993 | Kasdan | 382/133 |
| 5,287,272 | 2/1994 | Rutenberg et al. | 364/413.1 |
| 5,313,532 | 5/1994 | Harvey et al. | 364/413.1 |
| 5,315,700 | 5/1994 | Johnston et al. | 395/163 |
| 5,361,140 | 11/1994 | Hayenga et al. | 358/446 |
| 5,361,379 | 11/1994 | White | 382/227 |
| 5,432,868 | 7/1995 | Obata et al. | 382/159 |
| 5,544,650 | 8/1996 | Boon et al. | 128/632 |

OTHER PUBLICATIONS

Lee. James S. et al., "A Processing Strategy for Automated Papanicolaou Smear Screening", *Analytical and Quantitative Cytology and Histology*, The International Academy of Cytology, 14:5, pp. 415–425, Oct. 1992.

Chow et al., "Robustness Test of an Incipient Fault Detector Artificial Neural Network", Departmant of Electrical and Computer Engineering, North Carolina State University, Raleigh, NC 27695–7911, pp. I–73 –I–78, *International Joint Conference in Neural Networks*, Jul. 8–12, 1991 proceedings. ©1991 IEEE.

McAulay et al., "Robust Aircraft Classification Using Moment Invariants, Neural Network, and Split Inversion Learning", Wright State University, Dept. of Computer Science and Engineering, Dayton, OH 45435, *International Joint Conference on Neural Networks*, Jul. 8–12, 1991 proceedings.

(List continued on next page.)

*Primary Examiner*—Yon J. Couso
*Assistant Examiner*—Jayanti K. Patel
*Attorney, Agent, or Firm*—Hans I. Sun; Emil Moffa

[57] ABSTRACT

A robust biological specimen classifier. An automated microscopy system obtains features from an image of a biological specimen slide. A computer system in the automated microscopy system computes feature variations. Clusters are created that comprise samples of similar characteristics. A cluster membership generator generates membership values for each cluster. Classifiers specialized to certain feature sets are used to provide independent outputs. These outputs are offset and biased by the output of the membership generator. The output of the adjusted classification values are summed to create a slide score output.

29 Claims, 6 Drawing Sheets

OTHER PUBLICATIONS

Zhou et al., "A Statistical–Heuristic Feature Selection Criterion for Decision Tree Induction", pp. 834–841, *IEEE Transactions on Pattern Analysis and Machine Intelligence*, vol. 13, No. 8, Aug. 1991, ©1991 IEEE.

Bacus, James W. and Lee J. Grace, "Optical Microscope System For Standardized Cell Measurements and Analyses", *Applied Optics*, 26:16, pp. 3280–3293, 15 Aug. 1987.

Bartels, Peter H. et al., "A Self–Learning Computer Program for Cell Recognition", *ACTA Cytologica: The Journal of Clinical Cytology*, 14 :8, pp. 486–494, Oct. 1970.

Tanaka, Noboru et al., "Automated Cytologic Screening System (CYBEST Model 4) : an Integrated Image Cytometry System", *Applied Optics*, vol. 26, No. 16, pp. 3301–3307, Aug. 15, 1987. Copyright © 1987 by the Optical Society of America.

Tou, J.T. et al., p. 20 and "Chapter 3: Pattern Classification By Distance Functions", *Pattern Recognition Principles*, pp. 75–109, Addison–Wesley Publishing Company, 1974.

Duda, Richard O. and Peter E. Hart, "Fisher's Linear Discriminant", *Patent Classification and Scene Analysis*, Copyright ©1973, pp. 114–119.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, as Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Smith, Warren J., "Image Evaluation", *Modern Optical Engineering*, McGraw–Hill Book Company, 1966, pp. 308–325.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Kurman, Robert J. et al., "Part 1: Specimen Adequacy" and Part 2: Descriptive Diagnoses, *The Bethesda System for Reporting Cervical/Vaginal Cytologic Diagnoses*, Springer–Verlag.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

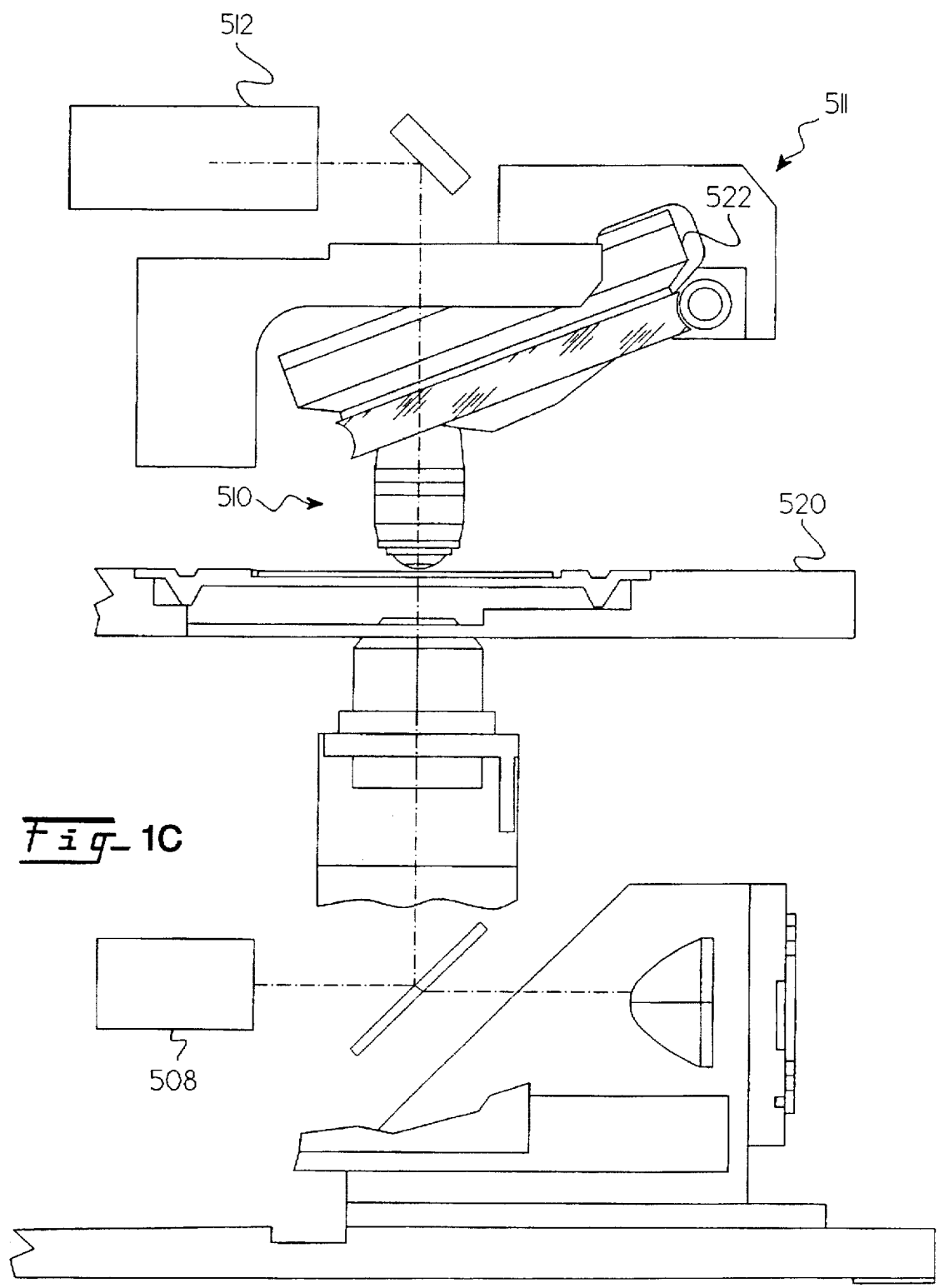
Fig_1C

METHOD AND APPARATUS FOR ROBUST BIOLOGICAL SPECIMEN CLASSIFICATION

The invention relates to a cytological specimen classifier and, more particularly, to a cytological specimen classifier that uses multiple classifiers where each classifier is specialized to a specific range of feature variations.

BACKGROUND OF THE INVENTION

Conventionally prepared Pap smears vary considerably from each other. These variations arise from variations due to patient population, slide sampling, fixation, and staining methods as well as laboratory specific practices. The variations greatly degrade the potential discriminating power of cellular features and slide characteristics. It is well known that large performance variations are a result of variations in laboratory methods or staining methods. The prior art has not provided a robust cytological specimen classifier that can handle all variations. Most of the systems have to sacrifice robustness to achieve an acceptable level of accuracy. However, this condition greatly limits the applicability of the system to a wide range of slide types, processes and labs.

SUMMARY OF THE INVENTION

The invention provides a robust and accurate probability of abnormality for prepared Pap smear slides which originate from different patient population, slide sampling, fixation, and staining methods. A robust biological specimen classifier obtains features from biological slides. Samples are clustered based on feature variations. Each cluster consists of samples of similar characteristics. Given clusters, a cluster membership generator generates the membership value of each sample to each cluster. Classifiers are designed to handle slides from different clusters. From the results of classifiers of each cluster and membership values to each cluster, the final result is integrated. This overall result indicates abnormality for a given slide.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show the robust biological specimen classification system of the invention.

DETAILED DESCRIPTION OF THE PREFERRED EMBODIMENT

Figure 1A:
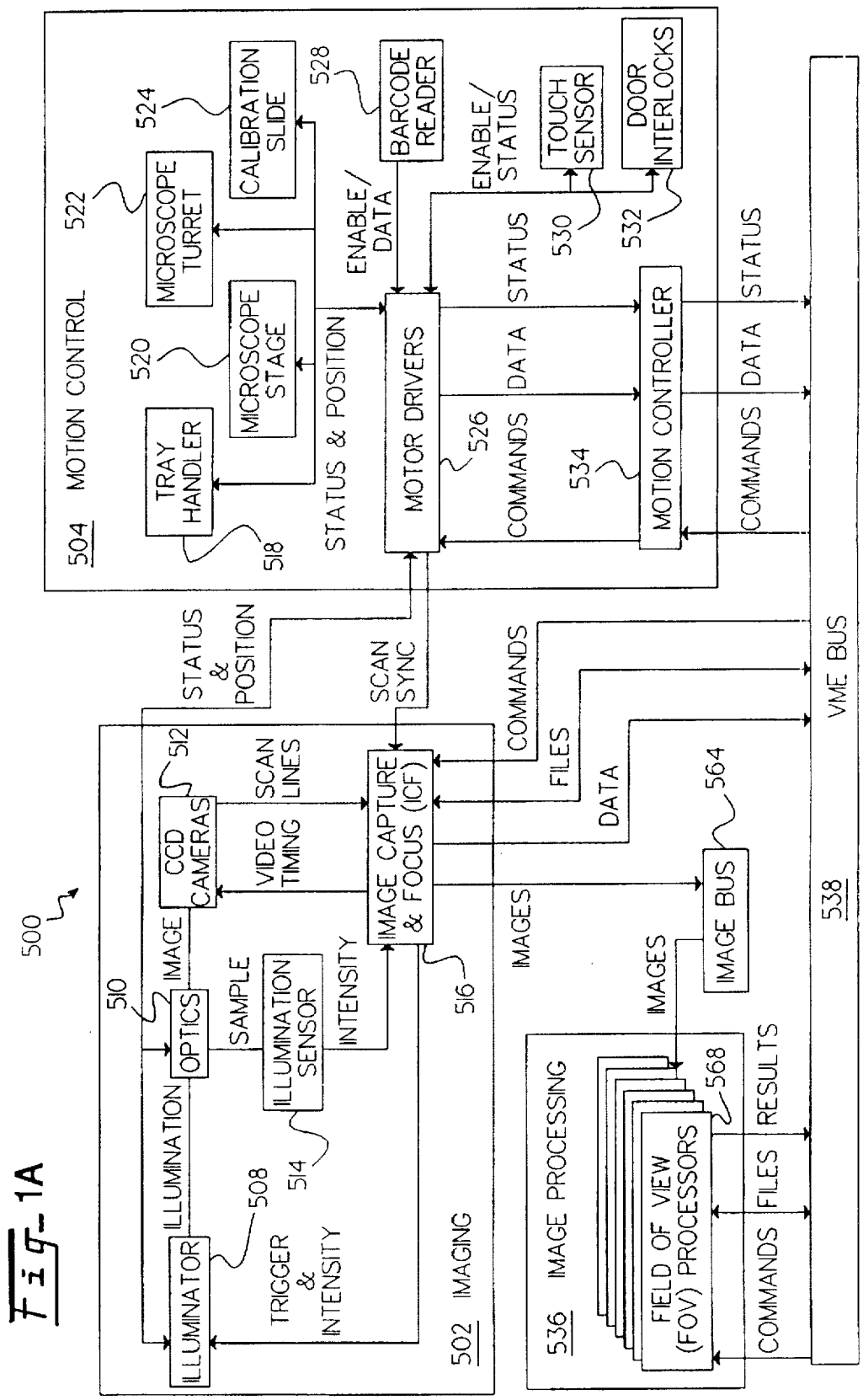

In a presently preferred embodiment of the invention, the system disclosed herein is used in a system for analyzing cervical pap smears, such as that shown and disclosed in copending U.S. patent application Ser. No. 08/571,686 which is a continuation of abandoned U.S. patent application Ser. No. 08/571,686, filed Dec. 13, 1995, which is a file wrapper continuation of abandoned U.S. patent application Ser. No. 07/838,064, entitled "Method For Identifying Normal Biomedical Specimens", by Alan C. Nelson et al., filed Feb. 18, 1992; U.S. Pat. No. 5,528,703, which is a continuation in part of abandoned U.S. patent application Ser. No. 07/838,395, entitled "Method For Identifying Objects Using Data Processing Techniques", by S. James Lee, filed Feb. 18, 1992; U.S. patent application Ser. No. 07/838,070, now U.S. Pat. No. 5,315,700, entitled "Method And Apparatus For Rapidly Processing Data Sequences", by Richard S. Johnston et al., filed Feb. 18, 1992; U.S. patent application Ser. No. 07/838,065, now U.S. Pat. No. 5,361,140, entitled "Method and Apparatus for Dynamic Correction of Microscopic Image Signals" by Jon W. Hayenga et al.; and allowed U.S. patent application Ser. No. 08/302,355, filed Sep. 7, 1994 entitled "Method and Apparatus for Rapid Capture of Focused Microscopic Images" to Hayenga et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 unless otherwise noted, and which are all hereby incorporated by reference including pending U.S. patent application Ser. No. 08/309,118, to Kuan et al. entitled, "Field Prioritization Apparatus and Method," pending U.S. patent application Ser. No. 08/309,061, to Wilhelm et al., entitled "Apparatus for Automated Identification of Cell Groupings on a Biological Specimen," pending U.S. patent application Ser. No. 08/309,116 to Meyer et at. entitled "Apparatus for Automated Identification of Thick Cell Groupings on a Biological Specimen," U.S. patent application Ser. No. 08/667,292, filed Jun. 20, 1996, which is a file wrapper continuation of abandoned U.S. patent application Ser. No. 08/309,115 to Lee et al. entitled "Biological Analysis System Self Calibration Apparatus," U.S. patent application Ser. No. 08/678,124, filed Jul. 11, 1996, which is a file wrapper continuation of abandoned U.S. patent application Ser. No. 08/308,992, to Lee et at. entitled "Apparatus for Identification and Integration of Multiple Cell Patterns," pending U.S. patent application Ser. No. 08/309,063, for which the issue fee has been paid, to Lee et al. entitled "Method for Cytological System Dynamic Normalization," pending U.S. patent application Ser. No. 08/309,248, for which the issue fee has been paid, to Rosenlof et al. entitled "Method and Apparatus for Detecting a Microscope Slide Coverslip," U.S. patent application Ser. No. 08/309,077 now U.S. Pat. No. 5,566,249 to Rosenlof et al. entitled "Apparatus for Detecting Bubbles in Coverslip Adhesive," pending U.S. patent application Ser. No. 08/309,931, to Lee et al. entitled "Cytological Slide Scoring Apparatus," pending U.S. patent application Ser. No. 08/309,148 to Lee et al. entitled "Method and Apparatus for Image Plane Modulation Pattern Recognition", pending U.S. patent application Ser. No. 08/309,250 to Lee et al. entitled "Apparatus for the Identification of Free-Lying Cells" and pending U.S. patent application Ser. No. 08/309,117, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Figure 1B:
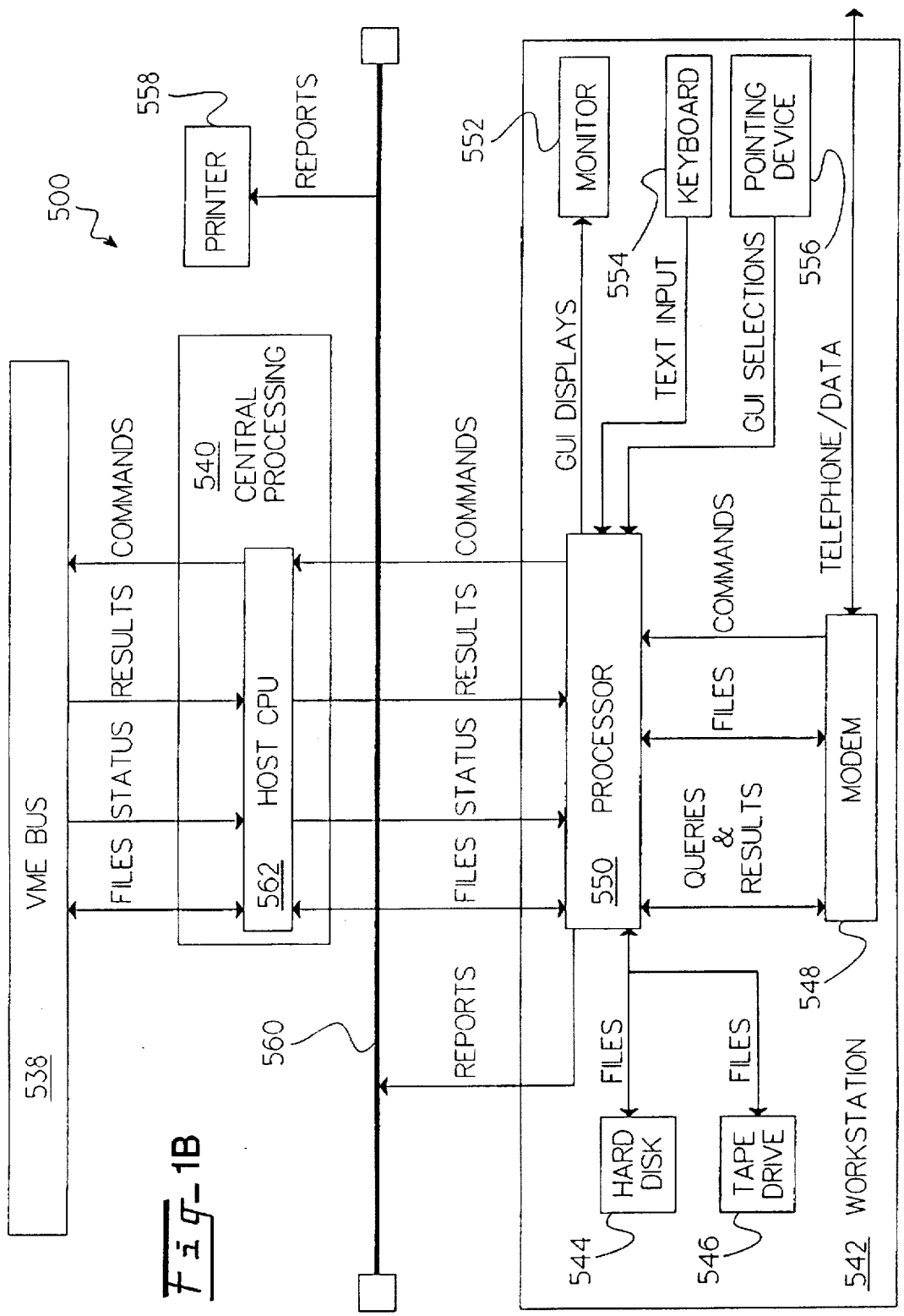

Now refer to FIGS. 1A, 1B and 1C which show a schematic diagram of one embodiment of the apparatus of the invention for robust biological specimen classification. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a workstation. A tape drive 546 is connected to the workstation 550 as well as a modem 548, a monitor 552, a keyboard 554, and a mouse pointing device 556. A printer 558 is connected to the ethernet 560.

During slide classification, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

Figure 2:
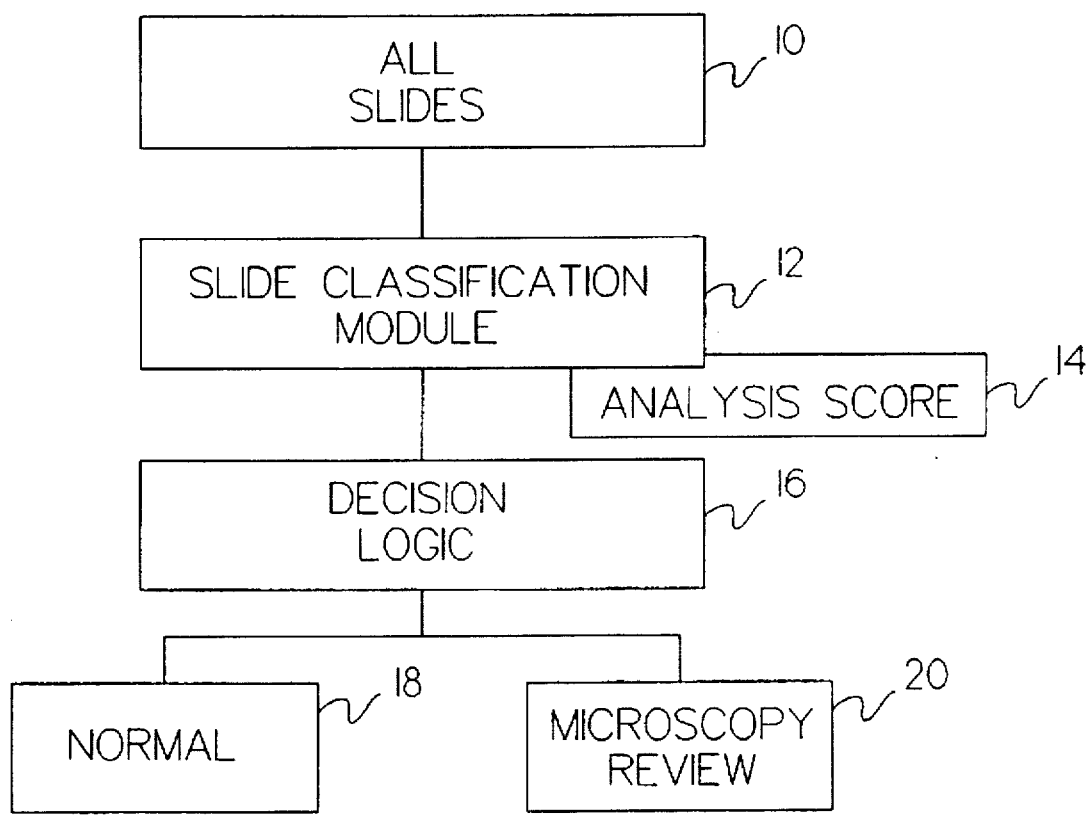
FIG. 2 shows the slide classification method of the invention.

Now refer to FIG. 2 which shows the slide classification architecture of the invention. The invention classifies biological specimens based on a distributed processing and information integration methodology. A biological specimen, such as a pap smear, is loaded into the slide processing system 12 of FIGS. 1A, 1B and 1C. The system processes the slides and generates an analysis score 14. The slides 10 are sorted into normal 18 or human review 20 categories based on a threshold of the analysis score 14. The decision logic is:

IF analysis score<normal threshold THEN normal ELSE microscopy review

In this invention, a method to achieve the balance between accuracy and robustness of an automated system is disclosed. To achieve the accuracy of the system, a distributed processing method is used. Multiple classifiers are designed, each is specialized in a specific range of feature variations to maximize its accuracy in that range. An information integration method is designed to integrate the highly accurate performance in each range into a highly robust and accurate system that performs over a full range of feature variations. The method described in this invention comprises three major steps: (1) determination of the overall classifier structure, (2) distributed classifier development, and (3) multiple classifier integration.

The block diagram is an example based on four distributed clusters. In the block diagram, the cluster membership generator generates the membership values for each classifier, $\mu_1$, $\mu_2$, $\mu_3$, and $\mu_4$. Each classifier generates the possibilities, or probabilities of being abnormal for each slide. The possibility of the abnormal for each classifier can be biased, so an offset value is introduced to compensate the bias effects.

Figure 3:
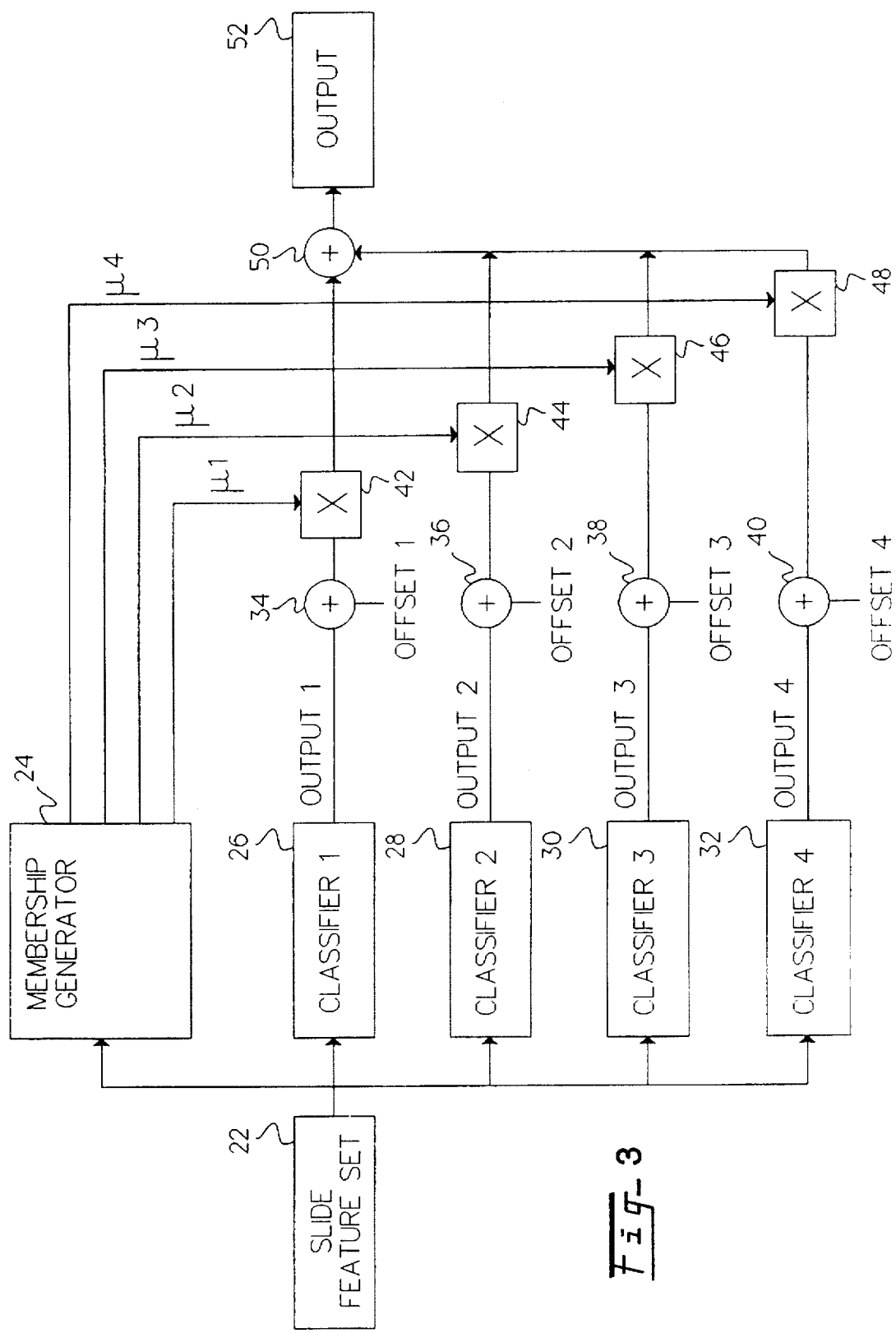
FIG. 3 shows a block diagram of the robust classifier of the invention.

Refer now to FIG. 3 which shows a block diagram of the robust classification apparatus of the invention. The slide feature set 22 is input to a membership generator 24, a first classifier 26, a second classifier 28, a third classifier 30, and a fourth classifier 32. The slide feature sets are used by the classifiers to provide an output that classifies the particular feature subset selected by the classifier. The outputs of each classifier are offset by predetermined offsets that are used to adjust to variations in the feature set. The resulting outputs of the weighted outputs of each classifier are added together using the summer 50 to aggregate classification output 52.

To determine the classifier structure, data is acquired from multiple sources with as wide a set of variations as possible. The gathered data are used to establish data clusters. The slide specimens within each cluster have very similar characteristics. Unsupervised clustering methods can be used to determine the number of clusters and data may be assigned to each cluster. The unsupervised clustering algorithm provides the clusters which have a similar characteristic within each cluster. The most popular and general methods of the unsupervised clusterings are disclosed in J. T. Tou and R. C. Gomalez, *Pattern Recognition Principles*, Addisson-Wesley Publishing Company, 1974. An isodata algorithm, fuzzy isodata algorithm, and k means clustering algorithm, fuzzy c means clustering. This method is based on the distance metric in feature space or performance space. In a training stage, if we do not have a priori information cornering the slide, we can use the unsupervised clustering algorithm on the feature space. However, if we have a priori information, for example, knowledge of the staining method, sampling method, or laboratory information, an unsupervised clustering algorithm on the performance space may be used rather than the feature space. The method in a preferred embodiment of the invention uses the following as a performance metric. The cluster is built from the available slides and the performance in sensitivity and specificity is examined. The specificity and sensitivity as an ordered pair, forms the performance space. The performance metric is used to group slides of different known variations such as staining difference into difference clusters.

In the cases where no a priori information is available for the samples, the clustering can be done based on feature distributions. The features that a clustering method may use include but are not limited by the darkness of the slide stain which reflect the staining method used, nuclear size which could reflect the slide preparation method used, or the risk group that patients are from. This clustering result determines the number of classifiers needed and the range of feature variations that each classifier will be specialized in. This is the major step to reduce the performance variation and degradation due to variations of the characteristics of the slides.

Given these clustering results, all the available slide characteristics are searched for the indicators, features, that can best predict which cluster each slide will belong to. With these indicators and the given cluster, the membership generator 24 shown in FIG. 3 is built. This membership generator would assign membership values $\mu_i(0 \leq \mu_i \leq 1)$, which are the possibilities, or probabilities that a specimen has originated from cluster i. Since the sum of the membership values is not necessarily equal to one, the membership values are normalized by the sum of the membership values. For example, if the membership values are $\mu_1, \mu_2, \ldots, \mu_c$, then the normalized membership value is:

$$\mu_i \leftarrow \mu_i / \sum_{c=1}^{C} \mu_c$$

Based on the clustering results, a classifier is developed for each cluster. The data used to train each classifier are all the available data samples of all clusters, however, each sample is weighted by a factor which is the cluster membership value $\mu_i$ computed in the first step. This enables a proportionate and smooth contribution of each data sample to the classifier that is designed to be specialized for the cluster. Using this method, the variation of the overall result can be reduced in comparison to other methods using a clear-cut, exclusive training data set for each classifier. The methodology used for the classifier construction is not limited, although in our preferred embodiment fuzzy type of classifiers are used.

One fuzzy type classifier is the binary fuzzy decision tree. The structure of binary fuzzy decision tree is the same as the conventional binary decision tree. However, the operations of the nodes and links are different. The following is an example of the operation.

In a nonterminal node, let $\bar{x}$ be an input feature vector; and $\bar{w}$ be the selected unit projection vector. $P_L(P_R)$ and $\sigma_L(\sigma_R)$ be the mean and standard deviation of the projection scalars derived from the training population that went to the descending node. The conditional possibilities of reaching the direct left and right descending nodes from the nonterminal node, $\mu_L$, $\mu_R$, are computed based on the following equations. Note that the conditional possibility of reaching root node Q is 1.

$$\mu_L(\bar{x}) = 1 - \mu_R(\bar{x}) = \frac{1}{1 + fac(\bar{x})}$$

where $fac(\bar{x}) = \frac{\sigma_L}{\sigma_R} \exp\left[\frac{1}{2k^2}\left(\frac{\eta_L}{\sigma_L^2} - \frac{\eta_R}{\sigma_L^2}\right)\right]$ and $$\eta_L = \begin{cases} (p - p_L)^2; & (p - p_L)(p_R - p_L) > 0 \\ 0; & \text{otherwise} \end{cases} \text{ and}$$

$$\eta_R = \begin{cases} (p - p_R)^2; & (p - p_R)(p_L - p_R) > 0 \\ 0; & \text{otherwise} \end{cases}$$

$p = \bar{w}^T \bar{x}$ and k is the adjustment factor for the conditional possibility function. If k=1, then the possibility becomes probability under the Gaussian distribution assumption.

The link operation depends on the structure of the tree. From the structure of the tree, the parent node and child node relationship along any path from the root node to a terminal node is defined. To estimate the possibility of reaching a certain terminal node i, borrowing from the Baysian conditional probability, multiply the conditional possibility value of each node along the path from the root node to terminal node i:

$$poss(i,\bar{x}) = \prod_{j=1}^{N} \mu_{sj}(j,\bar{x})$$

where $_{sj}$ is L(R) if $(j-1)^{th}$ ascendant is left (right) side of $j^{th}$ ascendant.

Given a fixed tree structure, the evidence values of terminal nodes based on a training data set are computed. The evidence values are the probability that $\bar{x}$ belongs to different classes for each terminal node, based upon the training data. If the possibilities of terminal nodes are $$poss(0,\bar{x}), poss(1,\bar{x}), \ldots, poss(T,\bar{x})$$

and their associated evidence values of class c are $$evid(0,c), evid(1,c), \ldots, evid(T,c),$$

then the membership to a given class c is $$mem(c,\bar{x}) = \sum_{i=0}^{T} poss(i,\bar{x}) \cdot evid(i,c)$$

For the membership generator, the outputs of the membership generator are $mem(c,\bar{x})$, $1 \leq c \leq C$. For the classifiers, the outputs from each of the classifiers are $mem(c,\bar{x})$, where c is an abnormal class.

Figure 4:
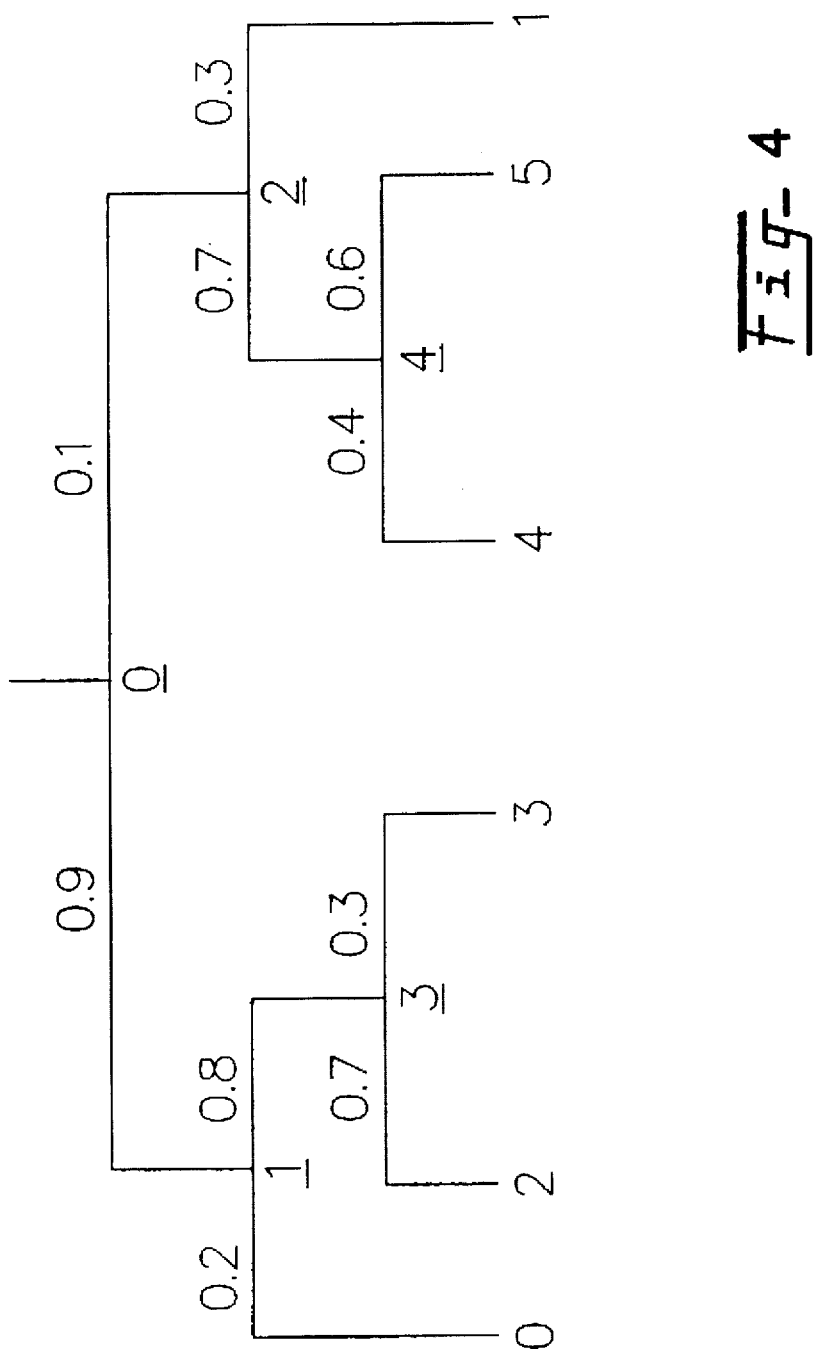
FIG. 4 shows an example decision tree.

To explain the operations of the tree, a hypothetical example is provided. One example tree structure is shown in FIG. 4. Given an input feature vector $\bar{x}$ we further assume the computed conditional possibilities of each nonterminal node. For example, $\mu_L$, $\mu_R$ of nonterminal node $\underline{0}$ are 0.9 and 0.1.

Based on the above conditional possibilities, the possibility value for each terminal node is:

$poss(0,\bar{x}):0.9 \cdot 0.2 = 0.18$ $poss(1,\bar{x}):0.1 \cdot 0.3 = 0.03$ $poss(2,\bar{x}):0.9 \cdot 0.8 \cdot 0.7 = 0.504$ $poss(3,\bar{x}):0.9 \cdot 0.8 \cdot 0.3 = 0.216$ $poss(4,\bar{x}):0.1 \cdot 0.7 \cdot 0.4 = 0.028$ $poss(5,\bar{x}):0.1 \cdot 0.7 \cdot 0.6 = 0.042$ The following are the evidence values for each terminal node:

| Terminal Node # | Class 0 | Class 1 | Class 2 | Class 3 |
| --- | --- | --- | --- | --- |
| 0 | 0.35 | 0.45 | 0.08 | 0.12 |
| 1 | 0.04 | 0.03 | 0.50 | 0.43 |
| 2 | 0.34 | 0.34 | 0.15 | 0.17 |
| 3 | 0.23 | 0.20 | 0.30 | 0.27 |
| 4 | 0.27 | 0.24 | 0.26 | 0.23 |
| 5 | 0.16 | 0.10 | 0.40 | 0.34 |

The membership value for each class is:

mem(Class0,x̄):0.35·0.18+0.04·0.03+0.34·0.504+0.23·0.216+
0.27·0.028+0.16·0.042=0.300 mem(Class1,x̄):0.45·0.18+0.03·0.03+0.34·0.504+0.20·0.216+
0.24·0.028+0.10·0.042=0.307

The information produced by the distributed classifiers mem(Class2,x̄):0.08·0.18+0.50·0.03+0.15·0.504+0.30·0.216+
0.26·0.028+0.40·0.042=0.194 mem(Class3,x̄):0.12·0.18+0.43·0.03+0.17·0.504+0.27·0.216+
0.23·0.028+0.34·0.042=0.199 are integrated by the following method. Using the membership values and the results of the classifier for each clusters, the final result is computed as:

$$output = \frac{\sum_{c=1}^{C} \mu_i(output_i - offset_i)}{\sum_{c=1}^{C} \mu_i}$$

where output and $output_i$ are the final classification result and result of classifier i. The $offset_i$ is an offset value to adjust the bias value of classifier i. The bias is adjusted to achieve a balance of the accuracy and robustness. The above is for the operation of the classifier.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automated apparatus for classification of a Pap stained slide, the automated apparatus comprising:
    (a) means for acquiring at least one image from the Pap stained slide having at least one image output;
    (b) means for obtaining at least one slide feature from the at least one image having at least one slide feature output;
    (c) a plurality of classifiers, each connected to the at least one slide feature output and each having a classification output;
    (d) means for applying an offset to each classification output of the plurality of classifiers wherein the means for applying an offset has a plurality of offset outputs;
    (e) means for membership generation connected to the at least one slide feature output wherein the means for membership generation has a plurality of membership value outputs;
    (f) means for adjusting the plurality of offset outputs with the membership value outputs wherein the means for adjusting the plurality of offset outputs has a plurality of adjusted classification outputs; and
    (g) means for aggregating the adjusted classification outputs wherein the means for aggregating the adjusted classification outputs has an aggregated classification output.

2. The apparatus of claim 1 wherein:
    (a) the means for applying an offset has an offset terminal summer for each of the plurality of classifiers to offset the classification output of each of the plurality of classifiers with a predetermined offset value having an offsetted classifier output;
    (b) the means for membership generation has a membership generator having a membership weighting factor output for each one of the plurality of classifiers;
    (c) the means for adjusting the plurality of offset outputs has a multiplier for multiplying each of the membership weighting factor by each offsetted classifier output having membership adjusted outputs for each offsetted classifier output; and
    (d) the means for aggregating the adjusted classification outputs has a summer to sum all of the membership outputs to produce a robust classification output.

3. The apparatus of claim 2 wherein the membership generator comprises a membership classifier.

4. The apparatus of claim 3 wherein the membership classifier comprises a K means clustering classifier.

5. The apparatus of claim 3 wherein the membership classifier comprises a fuzzy classifier.

6. The apparatus of claim 3 wherein the membership classifier comprises a Bayes belief network.

7. The apparatus of claim 5 wherein the fuzzy classifier comprises a fuzzy isodata clustering classifier.

8. The apparatus of claim 5 wherein the fuzzy classifier comprises a C means clustering classifier.

9. The apparatus of claim 5 wherein the fuzzy classifier comprises a fuzzy decision tree.

10. The apparatus of claim 2 wherein the membership generator comprises at least one membership feature extractor.

11. The apparatus of claim 10 wherein the at least one membership feature extractor comprises a specimen staining density extractor.

12. The apparatus of claim 10 wherein the at least one membership feature extractor comprises a specimen staining contrast extractor.

13. The apparatus of claim 10 wherein the at least one membership feature extractor comprises a reference cell nuclear size extractor.

14. The apparatus of claim 10 wherein the at least one membership feature extractor comprises at least one counter for objects of interest.

15. The apparatus of claim 1 wherein the Pap stained slide is a gynecological specimen.

16. An automated apparatus for classification of a biological specimen slide, the automated apparatus comprising:
    (a) means for acquiring an image from the biological specimen slide having an image output;
    (b) means for obtaining at least one slide feature from the image output having at least one slide feature output; and
    (c) means for slide scoring using a plurality of classifiers, wherein each of the plurality of classifiers has a feature input connected to the at least one slide feature output and has a classified output wherein each classified output is offset to adjust for variations in at least one slide feature and adjusted by membership values, wherein the adjusted values are aggregated to generate an analysis score output.

17. The apparatus of claim 16 further comprising a means for deciding whether a slide is normal or requires review, having an input connected to the at least one analysis score output and having a decision output.

18. The apparatus of claim 16 wherein the means for slide scoring comprises a membership classifier.

19. The apparatus of claim 18 wherein the membership classifier comprises a K means clustering classifier.

20. The apparatus of claim 18 wherein the membership classifier comprises a fuzzy classifier.

21. The apparatus of claim 20 wherein the fuzzy classifier comprises a fuzzy isodata clustering classifier.

22. The apparatus of claim 20 wherein the fuzzy classifier comprises a C means clustering classifier.

23. The apparatus of claim 20 wherein the fuzzy classifier comprises a fuzzy decision tree.

24. The apparatus of claim 18 wherein the membership classifier comprises a Bayes belief network.

25. The apparatus of claim 16 wherein the biological specimen is a gynecological specimen.

26. The apparatus of claim 20 wherein the fuzzy classifier comprises a means for calculating a distance metric.

27. The apparatus of claim 26 wherein the means for calculating a distance metric comprises a means for calculating the distance metric in feature space.

28. The apparatus of claim 26 wherein the means for calculating a distance metric comprises a means for calculating the distance metric in classification performance space.

29. The apparatus of claim 28 wherein the means for calculating the distance metric in classification performance space further comprises a means for measuring an area under a receiver operating characteristic curve.

* * * * *

UNITED STATES PATENT AND TRADEMARK OFFICE
CERTIFICATE OF CORRECTION

PATENT NO. : 5,740,269

DATED : April 14, 1998

INVENTOR(S) : Oh, et al

It is certified that error appears in the above-identified patent and that said Letters Patent is hereby corrected as shown below:

Column 2, line 32, delete the word "et at." and replace it with -- et al. --.

Column 2, line 41, delete the word "et at." and replace it with -- et al. --.

Column 5, equation $\mu_L(\bar{x}) = 1 - \mu_R(x) = \dfrac{1}{1 + fac(x)}$ , the portion of the equation reading $\mu_R(x)$ should be $\mu_R(\bar{x})$. In the same equation, the portion reading $fac(x)$ should be $fac(\bar{x})$.

UNITED STATES PATENT AND TRADEMARK OFFICE
CERTIFICATE OF CORRECTION

PATENT NO. : 5,740,269
DATED : April 14, 1998
INVENTOR(S) : Oh, et al

It is certified that error appears in the above-identified patent and that said Letters Patent is hereby corrected as shown below:

Column 6, equation $poss(i, x) = \prod_{j=1}^{N} \mu_{sj}(j, x)$, the portion of the equation reading $(i, x)$ should be $(i, \bar{x})$. In the same equation, the portion reading $(j, x)$ should be $(j, \bar{x})$.

Signed and Sealed this

Thirteenth Day of October 1998

Attest:

BRUCE LEHMAN

*Attesting Officer*

*Commissioner of Patents and Trademarks*